Nov. 2, 1954     R. T. BUTLER     2,693,381
LATCH MECHANISM
Filed April 30, 1951     2 Sheets-Sheet 1
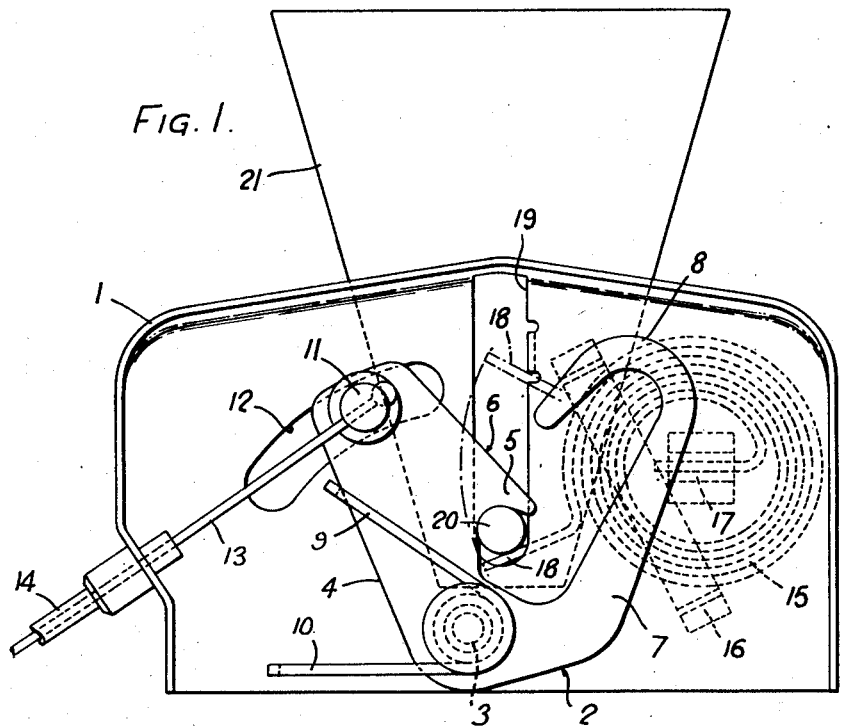
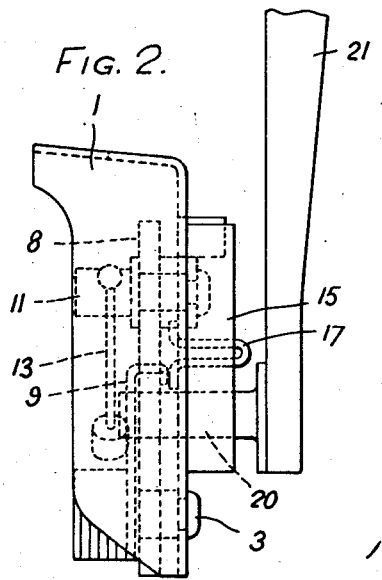
INVENTOR
Roy Thomas Butler.
BY
Elmer Jamison Gray
ATTORNEY.

Nov. 2, 1954  R. T. BUTLER  2,693,381
LATCH MECHANISM
Filed April 30, 1951  2 Sheets-Sheet 2
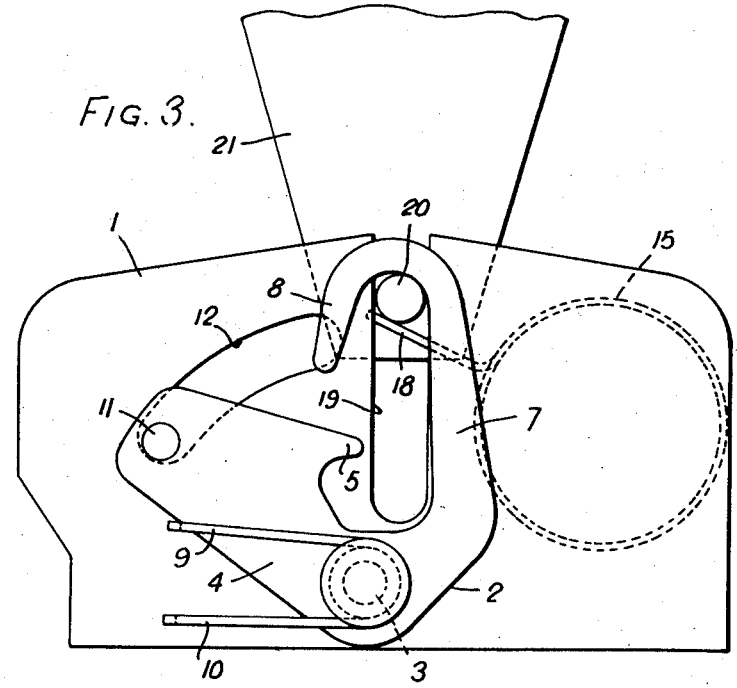
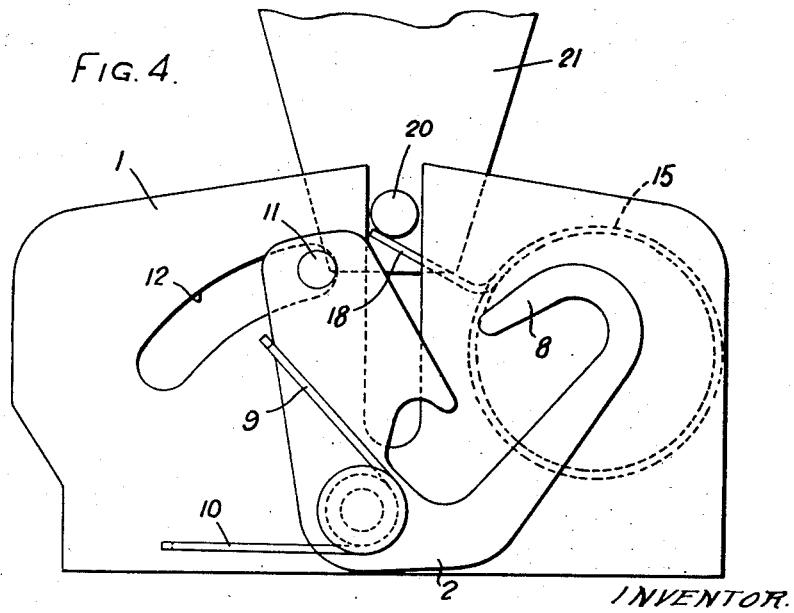
INVENTOR.
Roy Thomas Butler.
BY
Elmer Jamison Gray
ATTORNEY.

United States Patent Office 2,693,381
Patented Nov. 2, 1954

2,693,381

LATCH MECHANISM

Roy Thomas Butler, Detroit, Mich., assignor to Briggs Manufacturing Co., Detroit, Mich., a corporation of Michigan Application April 30, 1951, Serial No. 223,798

9 Claims. (Cl. 292—117)

The present invention relates to improvements in and relating to latch mechanism for doors, or other closures and is particularly but not exclusively concerned with latch means for the hood or bonnet of the engine of a motor vehicle or the cover or lid of a rear luggage compartment of a motor vehicle.

According to the present invention the latch mechanism comprises a support having spaced primary and secondary latch portions for co-operable locking engagement with a keeper, the primary latch portions being adapted to engage the keeper when the closure is in fully closed position and the secondary latch portion being adapted to engage the keeper to hold the closure in partly open or ajar position and being releasable upon movement of the closure from partly open towards fully closed position.

To enable the invention to be fully understood it will now be described with reference to the accompanying drawings in which:

Fig. 1 is an elevation showing the latch mechanism locking the keeper of a closure member in fully closed position.

Fig. 2 is a side view of Fig. 1.

Fig. 3 is a view similar to Fig. 1 but showing the latch mechanism holding the closure in partly open or ajar position and Fig. 4 shows the position of the latch mechanism after the secondary latch portion has been released.

As shown in the accompanying drawings the latch mechanism comprises a casing or support 1, adapted to be mounted on a fixed member adjacent to the closure. A catch plate 2 is mounted on the casing 1 for pivotal movement on a pivot pin 3. The catch plate is of generally U-shape and comprises an arm 4 formed with a hooked portion 5 which constitutes a primary latch portion, and a sloping cam surface 6. The second arm 7 of the catch plate is formed with a hook 8 which is spaced outwardly of the pivot pin 3 from the hook 5, the free end of the hook 8 overlapping that of the hook 5. The arm 7 and hook 8 constitute a secondary latch portion. The catch plate is normally urged in a clockwise direction, as viewed in Figs. 1, 3 and 4, by a hairpin spring one arm 9 of which abuts the arm 4 and the other arm 10 is anchored to the casing.

The arm 4 carries a stud 11 which is guided in an arcuate slot 12 in the casing wall 1a and is connected with the inner wire 13 of a Bowden wire device 14 which is adapted to be operated by a push or pull button mounted on a part remote from the latch mechanism. Where the latch mechanism is applied to the engine hood or bonnet of a vehicle the operating button may be mounted on the dashboard of the vehicle.

A coil spring 15 is mounted on the wall 1a of the casing 1 and secured by a strap 16, the inner end of the spring being anchored at 17 and the outer end 18 extending transversely of a vertical slot 19 in the wall 1a.

A movable closure to be secured by the latch is provided with a keeper stud 20, which as shown, is mounted on a part 21 of the movable closure.

When the closure member is moved to closed position, the keeper stud enters the slot 19 in the wall 1a of the casing and engages the end of the spring 18 and depresses it from the upper position, shown in broken lines in Fig. 1 as the keeper stud is forced downwardly in the slot. The keeper eventually engages the cam surface 6 on the arm 4 and forces the catch plate 2 in an anti-clockwise direction against the action of the spring arm 9 until it passes the nose of the hook 5 whereupon the catch plate is rotated clockwise by its spring and the hook 5 engages and secures the stud 20 to lock the closure member.

When it is desired to open the closure member, the remote control push, or pull button is operated to actuate the Bowden wire and the catch plate 2 is rotated about its pivot 3 in an anti-clockwise direction into the position shown in Fig. 3 to disengage the hook 5 from the stud 20 which is then raised upwardly of the slot 19 by the spring arm 18. The hook 8 of the catch plate is however, positioned across the slot 19 in the path of the stud 20 and serves to retain the latter at the upper end of the slot when the Bowden wire is released. The closure is accordingly held in partially open or ajar position.

To free the stud 20 to open the closure member fully, the latter is moved towards its closed position a sufficient amount to depress the stud 20 below the nose of the hook 8 whereupon the catch plate is rotated clockwise by the spring arm 4 to the position shown in Fig. 4 wherein the hook 8 is displaced out of the path of the stud, the latter then being free to be lifted out of the upper end of the slot as the closure is moved into fully open position.

The invention accordingly provides an arrangement whereby a closure member may be initially released to assume an ajar position by operation of remote control means and is finally released by slight manual pressure forcing the closure towards closed position.

The invention is particularly applicable to engine hoods or lids of rear luggage compartments of motor vehicles as in these cases the initial opening is controlled by means within the vehicle, such as a push or pull button mounted on the dashboard, and full opening is obtained without it being necessary for the user to insert his hand into the small space available between the partly opened hood or lid and the support on which the latch is mounted, to manipulate release mechanism within the engine or luggage compartment.

If desired instead of the hooks 5, 8 being integral parts of the catch plate 2, they may comprise separate pivotally mounted members.

The invention is particularly applicable to engine hoods or the lids or covers of rear luggage compartments of motor vehicles, but is applicable to any other form of door or like closure. In such cases the hood, or lid may be counterbalanced by springs to facilitate opening and closing movement.

I claim:

1. In a latch mechanism adapted to engage a keeper on a closure member and movable with said closure member in a predetermined path toward and outward from a closed position with respect to a second member, supporting means adapted to be mounted on said second member, a shiftable catch plate mounted on said supporting means for shifting in one direction or the opposite to primary or secondary latching positions respectively, said plate having long and short portions adapted to extend outward adjacent opposite sides of said path of movement, the outer end of said short portion having a primary latch portion extending generally in said one direction toward said long portion into said path to block movement of said keeper from the closed position when said plate is at said primary latching position and being spaced from said long portion for passage of said keeper therebetween when said plate is at said secondary latching position, the outer end of said long portion having an inwardly opening hook portion extending generally in said opposite direction to overlap said primary latch portion and terminating in an inward projection spaced from the outer edge of said primary latch portion for passage of said keeper therebetween upon shifting of said plate, and means for shifting said plate.

2. In combination, supporting means, means for latching said supporting means to a keeper shiftable with respect to said supporting means between closed and open positions comprising a reciprocable catch plate mounted on the supporting means to reciprocate between primary and secondary latching positions, said plate having a primary latch portion projecting into the path of movement of a portion of said keeper from the closed position to block said movement when said plate is at the primary latching position and being shiftable with said plate from said path upon reciprocation of said plate to the secondary latching position, said plate also having a secondary latch portion projecting into said path of movement of said portion of said keeper from the closed position to block said movement when said plate is at said secondary latching position and being shiftable with said plate from said path upon reciprocation of said plate to said primary latching position, the location of said primary latch portion in said path being intermediate the location of said secondary latch portion in said path and the location of said keeper portion when said keeper is at the closed position, and means for reciprocating said plate.

3. In combination, supporting means, means for latching said supporting means to a keeper shiftable with respect to said supporting means between closed and open positions comprising a reciprocable catch plate mounted on the supporting means to reciprocate between primary and secondary latching positions, said plate having a primary latch portion projecting into the path of movement of a portion of said keeper from the closed position to block said movement when said plate is at the primary latching position and being shiftable with said plate from said path upon reciprocation of said plate to the secondary latching position, said plate also having a secondary latch portion projecting into said path of movement of said portion of said keeper from the closed position to block said movement when said plate is at said secondary latching position and being shiftable with said plate from said path upon reciprocation of said plate to said primary latching position, the location of said primary latch portion in said path being intermediate the location of said secondary latch portion in said path and the location of said keeper portion when said keeper is at the closed position, means for reciprocating said plate, including spring means yieldingly urging said plate from the secondary to the primary latching position.

4. In combination, supporting means, means for latching said supporting means to a keeper shiftable with respect to said supporting means in a predetermined path of opening movement between closed and open positions comprising latch means shiftably mounted on said supporting means for shifting between primary and secondary latching positions and having primary and secondary latch portions, the primary latch portion extending into said path at a location in advance of said keeper at the closed position to block opening movement thereof when said latch means is at said primary latching position and being shiftable with said latch means from said path upon shifting of said latch means to said secondary latching position, the secondary latch portion extending into said path at a location in advance of said first named location to block opening movement of said keeper when said latch means is at said secondary latching position and being shiftable with said latch means from said path upon shifting of said latch means to said primary latching position, means for shifting said latch means, including spring means yieldingly urging said latch means from the secondary to the primary latching position.

5. In a latch mechanism engageable with a keeper on a closure member pivotal in opening and closing movements with respect to a second member, supporting means adapted to be mounted on said second member, a catch plate pivoted on the supporting means and having a pair of latch portions alternately shiftable therewith into the path of opening movement of said keeper to block the same upon alternately pivoting of said plate in one direction to a primary latching position and in the opposite direction to a secondary latching position, the location of the latch portion in said path when said plate is at the secondary latching position being spaced in the direction of opening movement along said path from the location at which the other latch portion is in said path when said plate is at the primary latching position, spring means yieldingly urging swinging of said plate from the secondary to the primary latching position, and manually actuated means for swinging said plate from the primary to the secondary latching position.

6. In a latch mechanism adapted to engage a keeper on a vertically swinging hood of a vehicle body, supporting means adapted to be mounted on said body, a catch plate pivoted on the supporting means for swinging in one direction or the opposite to primary or secondary latching positions respectively, said plate having short and long portions adapted to extend upward adjacent opposite sides of the path of movement of said keeper, the upper end of the short portion having a primary latch portion extending in said one direction toward the long portion into said path to block upward movement of said keeper when said plate is at said primary latching position and being spaced from said long portion for passage of said keeper therebetween upon pivoting of said plate in said opposite direction, the upper end of said long portion having a downwardly opening hook portion overlying said primary latch portion when said plate is at said secondary latching position and terminating in a depending portion spaced from the upper edge of said primary latch portion for passage of said keeper therebetween upon pivoting of said plate, spring means yieldingly urging pivoting of said plate from the secondary to the primary latching position, and manually actuated means for pivoting said plate from the primary to the secondary latching position, said upper edge inclining in said opposite direction to comprise a cam edge for pivoting said plate in said opposite direction by engagement with said keeper upon downward movement thereof to the closed position.

7. In a latch mechanism adapted to engage a keeper on a vertically swinging hood of a vehicle body, supporting means adapted to be mounted on said body, a catch plate pivoted on the supporting means for swinging in one direction or the opposite to primary or secondary latching positions respectively, said plate having short and long portions adapted to extend upward adjacent opposite sides of the path of movement of said keeper, the upper end of the short portion having a primary latch portion extending in said one direction toward the long portion into said path to block upward movement of said keeper when said plate is at said primary latching position and being spaced from said long portion for passage of said keeper therebetween upon pivoting of said plate in said opposite direction, the upper end of said long portion having a downwardly opening hook portion overlying said primary latch portion when said plate is at said secondary latching position and terminating in a depending portion spaced from the upper edge of said primary latch portion for passage of said keeper therebetween upon pivoting of said plate, spring means yieldingly urging pivoting of said plate from the secondary to the primary latching position, and manually actuated means for pivoting said plate from the primary to the secondary latching position.

8. In a latch mechanism adapted to engage a keeper on a vertically swinging hood of a vehicle body, supporting means adapted to be mounted on said body, a catch plate pivoted on the supporting means for swinging in one direction to a primary latching position and in the opposite direction to a secondary latching position, said plate having a primary latch portion projecting in said one direction into the path of movement of a portion of said keeper to block upward swinging of said hood from its closed position when said plate is at said primary latching position and being shiftable with said plate from said path upon pivoting of said plate to said secondary latching position, said plate also having a secondary latch portion projecting in said opposite direction into said path of movement of said portion of said keeper to block upward swinging of said hood when said plate is at said secondary latching position and being shiftable with said plate from said path upon pivoting of said plate to said primary latching position, the location of said secondary latch portion in said path being above the location of said primary latch portion in said path, said secondary latch portion comprising a hook portion opening downward and in said one direction at a location above said primary latch portion, resilient means yieldingly urging pivoting of said plate from said secondary to said primary latching position, and manually actuated means for pivoting said plate from said primary to said secondary latching position.

9. In a latch mechanism adapted to engage a keeper on a vertically swinging hood of a vehicle body, supporting means adapted to be mounted on said body, a catch plate pivoted on the supporting means for swinging in one direction or the opposite to primary or secondary latching positions respectively, said plate having short and long portions adapted to extend upward adjacent opposite sides of the path of movement of said keeper, the upper end of the short portion having a primary latch portion extending in said one direction toward the long portion into said path to block upward movement of said keeper when said plate is at said primary latching position and being spaced from said long portion for passage of said keeper therebetween upon pivoting of said plate in said opposite direction, the upper end of said long portion having a downwardly opening hook portion overlying said primary latch portion when said plate is at said secondary latching position and terminating in a depending portion spaced from the upper edge of said primary latch portion for passage of said keeper therebetween upon pivoting of said plate, and means for pivoting said plate.

References Cited in the file of this patent

UNITED STATES PATENTS

| Number | Name | Date |
|---|---|---|
| 2,246,789 | Dall | June 24, 1941 |
| 2,268,741 | Dall | Jan. 6, 1942 |
| 2,508,090 | Beems et al. | May 16, 1950 |